UNITED STATES PATENT OFFICE.

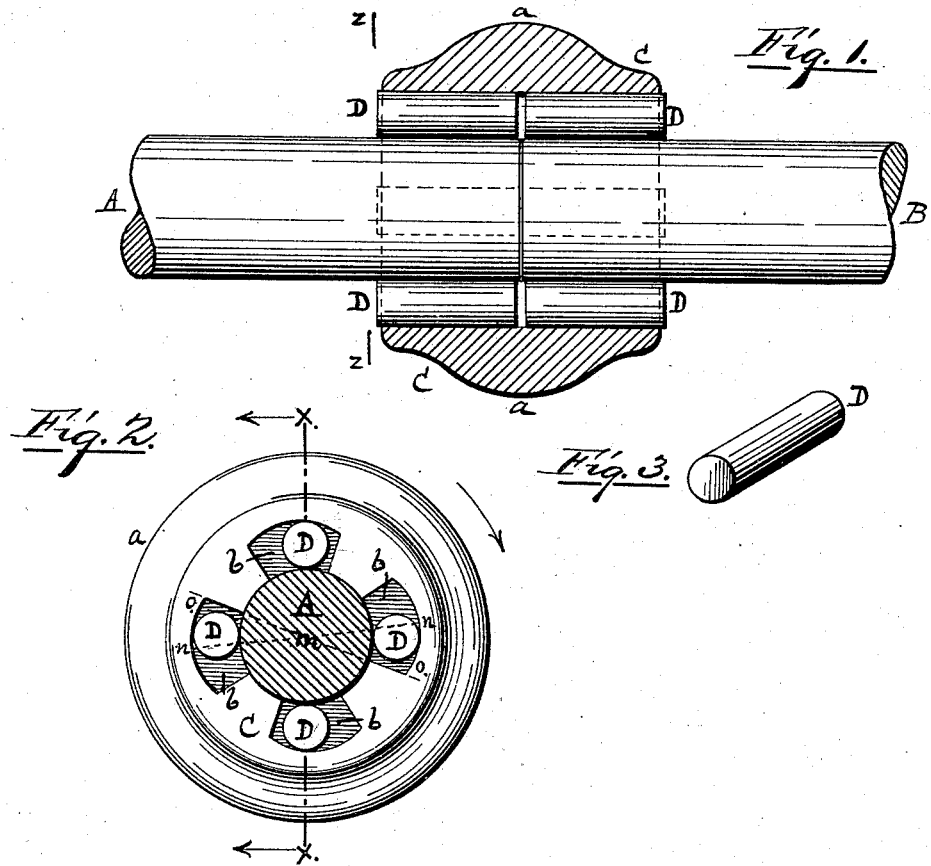

ROBERT F. HARGRAVES, OF PROVIDENCE, RHODE ISLAND.

COMPRESSION-COUPLING FOR SHAFTS.

SPECIFICATION forming part of Letters Patent No. 545,017, dated August 20, 1895.

Application filed April 13, 1894. Serial No. 507,397. (No model.)

*To all whom it may concern:*

Be it known that I, ROBERT F. HARGRAVES, of the city and county of Providence, in the State of Rhode Island, have invented a new and useful Improvement in Compression-Couplings for Shafts; and I declare the following to be a specification thereof, reference being had to the accompanying drawings.

Like letters indicate like parts.

Figure 1 is a view of my invention, partly in side elevation and partly in central longitudinal section. In this figure the shafts which are to be coupled and the rollers are seen in side elevation and the hub or collar is shown in section on line $x\ x$ of Fig. 2. Fig. 2 is an end elevation of my invention, the shaft being shown in cross-section on line $z\ z$ of Fig. 1. Fig. 3 is a perspective view of one of the rollers.

My invention is a device for coupling two abutting shafts so as to compel them to rotate together; and it consists of the combination of two abutting shafts with a collar or hub loosely mounted on said shafts at their ends and provided with transverse slots which extend through said collar or hub from side to side and which open into the central bore of said collar or hub, and rollers loosely rotatable in said slots, respectively, which lock said shafts and the collar or hub together by compression, owing to the movement of said rollers in the slots, the latter having the peculiar form hereinafter specified.

In the drawings, A B represent two cylindrical shafts whose ends abut.

C is a metallic collar or hub, having a central tubular aperture or bore and made preferably with a central circumferential enlargement, as $a$, for the sake of greater strength. This collar or hub C has several transverse slots $b$, (see Fig. 2,) which open into the central aperture or bore and which extend entirely through said collar or hub from one edge thereof to the other. The sides of said slots are preferably radial in direction and their bottoms, respectively, are arc-shaped or formed on the line of a true circle but of such a curve that the distance $m\ o$ is somewhat less than the distance $m\ n$, Fig. 2.

D D are cylindrical metallic rollers, of a diameter equal to the distance between the shaft A and the central point in the curved bottom of the slot. In each slot $b$ is a roller D or preferably two rollers, as seen in Fig. 1, arranged with abutting ends.

In practice I use the device as follows: In coupling shafts the collar or hub C is loosely slipped over one of the shafts A or B and the other shaft inserted therein, so that said shafts shall have their ends meet or abut centrally in said collar or hub, as in Fig. 1. The rollers D are inserted endwise in the slots $b$ of the collar or hub C and have a rolling contact between said collar or hub and the shafts, as shown. The rotation of either shaft A B causes each roller D to roll in its slot $b$ toward one side of said slot, and as the depth of the slot decreases toward the sides each roller is forced with great friction into a locking position, holding firmly by compression both shafts in position in the collar or hub and compelling them to move together. A reversal of the rotation of the shafts temporarily disengages the collar or hub from the shaft, but only to roll the rollers to the opposite side of the slots, respectively, and there to lock them again by friction, as before.

To couple shafts it has hitherto been usual to remove the shafting entirely from its bearings and to form key-seats or longitudinal grooves in the shafts, and to secure them together by a collar or hub with a key or spline connection. This requires considerable labor as well as heavy handling of the shafts and stoppage of machinery for a considerable time with the consequent loss and inconvenience.

It is obvious that my device requires no preparation of the shafts by cutting or otherwise and that it is practically a ready and efficient method of coupling. Moreover, the shafts can be made to revolve together or to be independent of each other, according as the rollers are inserted in the slots or not, as the rollers are detachable and can easily be pushed endwise or drawn outwardly entirely out of said slots. If desired, however, a collar may be put on to cover the ends of the slots $b$ to prevent any longitudinal removal of the rollers, and the coupling is thus made permanent.

Instead of being made in one piece, the collar or hub may be made in two pieces with flanges $c$ bolted together, as shown at $d$.

Pulleys may be mounted on shafts by having each a grooved hub and rollers frictionally mounted in the grooves in the same manner. When the rollers are in position in the slots the pulley is fast, but when the rollers are withdrawn the pulley is loose.

The ease and quickness with which the rollers D can be removed or replaced thus renders the device extremely useful for quickly disconnecting the shaft from the power and for renewing the connection when desired.

I claim as a novel and useful invention and desire to secure by Letters Patent—

The combination with a pair of abutting shafts having their axes in a common line, of a collar provided with a central bore to receive the adjacent ends of the shafts, said collar having a series of open-ended slots parallel with and opening into the central bore and formed with arc shaped bases, the radii of which arcs are equal, and less than the distances to the axes of the shafts, and a pair of rollers arranged end to end in each of said slots and bearing upon their respective shafts and the adjacent portions of the slot bases only and having diameters greater than the shortest distance between the surfaces of their respective shafts and the bases of the slots, whereby they may be influenced by their respective shafts only and may lie at all times parallel thereto.

ROBERT F. HARGRAVES.

Witnesses:
DANIEL W. FINK,
WARREN R. PERCE.